United States Patent
Mason

(10) Patent No.: US 12,456,258 B2
(45) Date of Patent: Oct. 28, 2025

(54) SYSTEMS AND METHODS FOR GENERATING A SHADOW MESH

(71) Applicant: Electronic Arts Inc., Redwood City, CA (US)

(72) Inventor: Ashton Mason, Brighton (GB)

(73) Assignee: Electronic Arts Inc., Redwood City, CA (US)

( * ) Notice: Subject to any disclaimer, the term of this patent is extended or adjusted under 35 U.S.C. 154(b) by 163 days.

(21) Appl. No.: 18/125,596

(22) Filed: Mar. 23, 2023

(65) Prior Publication Data

US 2024/0320919 A1    Sep. 26, 2024

(51) Int. Cl.
*G06T 15/60* (2006.01)
*G06T 17/20* (2006.01)

(52) U.S. Cl.
CPC ............ *G06T 17/205* (2013.01); *G06T 15/60* (2013.01); *G06T 2210/36* (2013.01)

(58) Field of Classification Search
CPC .... G06T 17/205; G06T 15/60; G06T 2210/36
See application file for complete search history.

(56) References Cited

U.S. PATENT DOCUMENTS

| | | | | |
|---|---|---|---|---|
| 2003/0071822 A1* | 4/2003 | Lake | | G06T 15/60 |
| | | | | 345/589 |
| 2004/0179009 A1* | 9/2004 | Kii | | G06T 15/405 |
| | | | | 345/421 |
| 2006/0038822 A1* | 2/2006 | Xu | | G06T 15/60 |
| | | | | 345/557 |
| 2012/0229445 A1* | 9/2012 | Jenkins | | G06T 15/405 |
| | | | | 345/418 |
| 2017/0091992 A1* | 3/2017 | Rogers | | G06T 17/20 |
| 2019/0102934 A1* | 4/2019 | Neulander | | G06T 15/005 |
| 2019/0221034 A1* | 7/2019 | Mason | | G06T 15/08 |

(Continued)

OTHER PUBLICATIONS

J. Strauss and A. Datta, "Simplified Shadow Volumes using Silhouette Level-of-Detail," 2007 International Conference on Computational Science and its Applications (ICCSA 2007), Kuala Lampur, Malaysia, 2007, pp. 524-531, doi: 10.1109/ICCSA.2007.39. (Year: 2007).*

(Continued)

*Primary Examiner* — Kent W Chang
*Assistant Examiner* — Karl Duc Truong
(74) *Attorney, Agent, or Firm* — Leydig, Voit & Mayer, Ltd.

(57) ABSTRACT

A method, device, and computer-readable storage medium for generating a shadow mesh. The method includes: receiving a graphics mesh; computing a set of LOD versions for each component of the graphics mesh, where each successive LOD version in the set of LOD versions includes fewer polygons than the preceding LOD version; computing a set of shadow versions for each component of the graphics mesh, where each successive shadow version in the set of shadow versions includes fewer polygons than the preceding shadow version, and each successive shadow version includes vertices that lie within a mesh defined by the preceding shadow version; generate N LOD meshes for the graphics mesh by selecting, for each LOD, a LOD version of each component to include in the LOD mesh; and generating a shadow mesh by selecting a shadow version of each component to include in the shadow mesh.

20 Claims, 12 Drawing Sheets

(56) References Cited

U.S. PATENT DOCUMENTS

2022/0096931 A1\* 3/2022 Raymond ............... G06T 13/00
2022/0198752 A1\* 6/2022 Brooks ..................... G06T 9/00

OTHER PUBLICATIONS

Bittner, Jiri, Vlastimil Havran, and Pavel Slavik. "Hierarchical visibility culling with occlusion trees." Proceedings. Computer Graphics International (Cat. No. 98EX149). IEEE, 1998. (Year: 1998).\*

Fawad, Mustafa S., Wang Wencheng, and Wu Enhua. "LOD Exploitation and Fast Silhouette Detection for Shadow Volumes." International Journal of Electrical and Computer Engineering 1.2 (2009): 92-98. (Year: 2009).\*

Liu, Nan, and Ming-Yong Pang. "A survey of shadow rendering algorithms: projection shadows and shadow volumes." 2009 Second International Workshop on Computer Science and Engineering. vol. 1. IEEE, 2009. (Year: 2009).\*

Li, Hua, Huamin Yang, and Cheng Han. "Sub-geometry shadow mapping based on normal detection." 2016 International Conference on Virtual Reality and Visualization (ICVRV). IEEE, 2016. (Year: 2016).\*

Li, Hua, and Wen Liu. "Accurate Shadow Generation Analysis in Computer Graphics." 2018 IEEE 20th International Conference on High Performance Computing and Communications; IEEE 16th International Conference on Smart City; IEEE 4th International Conference on Data Science and Systems (Year: 2018).\*

Liang, Yuzhi, et al. "Automatic mesh and shader level of detail." IEEE Transactions on Visualization and Computer Graphics 29.10 (2022): 4284-4295. (Year: 2022).\*

Bhatt, Ravi. Generating Geometry Silhouettes With Mesh Shaders For Use in Stencil Shadows. Diss. 2023. (Year: 2023).\*

Funkhouser et al. "Adaptive display algorithm for interactive frame rates during visualization of complex virtual environments," *SIGGRAPH '93: Proceedings of the 20th Annual Conference on Computer Graphics and Interactive Techniques*, pp. 247-254 (Sep. 1993) (available at: https://www.cs.princeton.edu/~funk/sig93.pdf).

Malhotra et al. "Open-Source Tool for Transforming CityGML Levels of Detail," *Energies*, vol. 14, Issue 24 (Dec. 8, 2021) (available at: https://www.mdpi.com/1996-1073/14/24/8250).

Garland et al. "Surface simplification using quadric error metrics," *SIGGRAPH '97: Proceedings of the 24th Annual Conference on Computer Graphics and Interactive Techniques*, pp. 209-216 (Aug. 1997) (available at: https://www.cs.cmu.edu/~./garland/Papers/quadrics.pdf).

\* cited by examiner

| Components | Versions (triangle counts) | | | | |
|---|---|---|---|---|---|
| | A | B | C | D | ... |
| 1 | 100 | 90 | 80 | 70 | ... |
| 2 | 90 | 85 | 83 | 80 | ... |
| 3 | 45 | 40 | 38 | 35 | ... |
| 4 | 300 | 250 | 200 | 190 | ... |
| 5 | 12 | 10 | 6 | 5 | ... |

FIG. 11

SYSTEMS AND METHODS FOR GENERATING A SHADOW MESH

FIELD

This disclosure generally relates to computer graphics and, more particularly, to systems and methods for generating a shadow mesh.

BACKGROUND

For three-dimensional (3D) graphics applications, such as video games or animated films, efficient processing of data by reducing computational complexity of a given operation is often useful. This is particularly the case in real-time applications, such as video games.

Various operations can be performed using computer generated objects in a scene. An object may be represented as a polygonal mesh, which comprises a collection of vertices, edges, and faces that define the shape and/or boundary of the object.

As used herein, shadow meshes are specialized polygonal meshes used for casting shadows in a rendered scene, such as in a game. Since shadows are only seen in black and white silhouette, they can often be rendered in less detail than the full resolution model. Using a less detailed mesh to render the shadows saves rendering time by rendering fewer triangles.

In conventional approaches, shadow meshes are hand-authored by an artist, often using an automatically generated level-of-detail (LOD) mesh as a starting point. As used herein, LOD meshes (or LODs) are simplified versions of the primary graphics mesh, with successively fewer triangles used as stand-ins for the primary mesh when the model is far away to reduce computational complexity.

Since shadow meshes are never seen directly and are only used to render shadows, shadow meshes can be simplified more than traditional LODs and in different ways. Small details and components are hard to make out in the shadow and can often be omitted. Geometry not visible in silhouette can be removed from shadow meshes particularly aggressively. Materials are immaterial to shadow meshes, and any geometry present purely to represent UVs or boundaries between different materials can be removed.

While authoring a specialized shadow mesh therefore offers significant opportunities for optimization, it is made difficult by an awkward technical requirement that arises from the way shadows are rendered. The shadow mesh should ideally not extend outside any of the graphics meshes that the shadow mesh is to be used with, otherwise the shadow mesh may "overshadow" the graphics mesh. Overshadowing, as used herein, refers to incorrectly casting shadows on a graphics mesh.

In addition, hand-authoring such a shadow mesh is quite tedious and difficult, not least because the multiple generated LODs represent a complex moving target. Staying inside the boundary of each successive LOD may be difficult for an artist to achieve with the shadow mesh, and if the LODs are re-authored for any reason then the shadow mesh must be updated as well.

As such, there remains a need in the art for an improved system and method for generating a shadow mesh.

SUMMARY

Embodiments of the disclosure provide a method, device, and computer-readable storage medium for generating a shadow mesh. The method includes: receiving a graphics mesh that is a computer representation of a three-dimensional (3D) object, wherein the graphics mesh comprises a set of components, and wherein each component in the set of components is a polygonal mesh; for each component in the set of components, generating a set of shadow versions of the component, wherein different shadow versions of the component include different polygon counts, wherein successive shadow versions of the component are generated by performing edge collapse operations to reduce a number of polygons in a successive shadow version relative to a preceding shadow version of the component, and wherein, for each shadow version of the component, a computed location of a new vertex created by the edge collapse operations is constrained to be located inside a set of planes of adjacent faces of an edge, from a preceding shadow version of the first component, that is collapsed during the edge collapse operations; generating a shadow mesh corresponding to the graphics mesh, wherein the shadow mesh is associated with a polygon budget, wherein generating the shadow mesh is based on performing an optimization algorithm that selects, for each component in the set of components, a shadow version of the component from the set of shadow versions of the component to include in the shadow mesh, and wherein the optimization algorithm optimizes visual fidelity of the shadow mesh while constrained to the polygon budget of the shadow mesh; and outputting the shadow mesh, wherein the shadow mesh is configured to be used to cast shadows from one or more light sources when rendering a scene including the 3D object.

In some embodiments, the method further comprises: for each component in the set of components, generating a set of level-of-detail (LOD) versions of the component, wherein different LOD versions of the component include different polygon counts, and wherein successive LOD versions of the component are generated by performing edge collapse operations to reduce a number of polygons in a successive LOD version relative to a preceding LOD version of the component; generating a LOD mesh corresponding to the graphics mesh, wherein a polygon budget of the LOD mesh is different from the polygon budget of the shadow mesh, and wherein generating the LOD mesh is based on performing an optimization algorithm that selects, for each component in the set of components, a LOD version of the component from the set of LOD versions of the component to include in the LOD mesh; and outputting the LOD mesh, wherein the LOD mesh is configured to replace the graphics mesh when rendering the scene including the 3D object.

In some embodiments, generating a set of LOD versions of a first component comprises: receiving a full resolution version of the first component included in the graphics mesh; and performing edge collapse operations on the full resolution version of the first component to generate a first LOD version of the first component; and performing edge collapse operations on the first LOD version to reduce a number of polygons in successive LOD versions relative to a preceding LOD version of the first component.

In some embodiments, generating a set of shadow versions of the first component comprises: receiving the full resolution version of the first component included in the graphics mesh; performing edge collapse operations on the full resolution version of the first component to generate a first shadow version of the first component; and performing edge collapse operations on the first shadow version to reduce a number of polygons in successive shadow versions relative to a preceding shadow version of the first component.

In some embodiments, each LOD version in the set of LOD versions of the first component has a corresponding shadow version in the set of shadow versions of the first component, the LOD version and a corresponding first shadow version of the first component have a same number of vertices and faces, and locations of at least some of the vertices in the first shadow version of the first component are different than locations of corresponding vertices in the first LOD version of the first component.

In some embodiments, the method further comprises: generating N LOD meshes, wherein N is an integer greater than or equal to 1; wherein each LOD mesh of the N LOD meshes is associated with a different polygon budget.

In some embodiments, for a given LOD mesh of the N LOD meshes, the optimization algorithm that selects a LOD version from the set of LOD versions for each component is constrained such that, for the given LOD mesh, no LOD version of a component is selected that includes fewer polygons than a number of polygons of the LOD version for that component selected for another LOD mesh of the N LOD meshes having a lower polygon budget than a polygon budget of the given LOD mesh.

In some embodiments, performing the optimization algorithm that selects, for each component in the set of components, a shadow version of the component from the set of shadow versions of the component to include in the shadow mesh comprises: constraining the optimization algorithm such that no shadow version of a component is selected for the shadow mesh that includes more polygons than a number of polygons of the LOD version for that component selected for a LOD mesh of the N LOD meshes that includes a polygon budget that is greater than a polygon budget of the shadow mesh.

In some embodiments, the graphics mesh is an artist-authored mesh, and the components in the set of components are disconnected from one another such that no vertex of the graphics mesh is shared by two components in the set of components.

BRIEF DESCRIPTION OF THE DRAWINGS

FIG. 11 is a conceptual diagram illustrating components of a graphics mesh and different versions of each component with different triangle counts, according to one embodiment.

DETAILED DESCRIPTION

Figure 1:
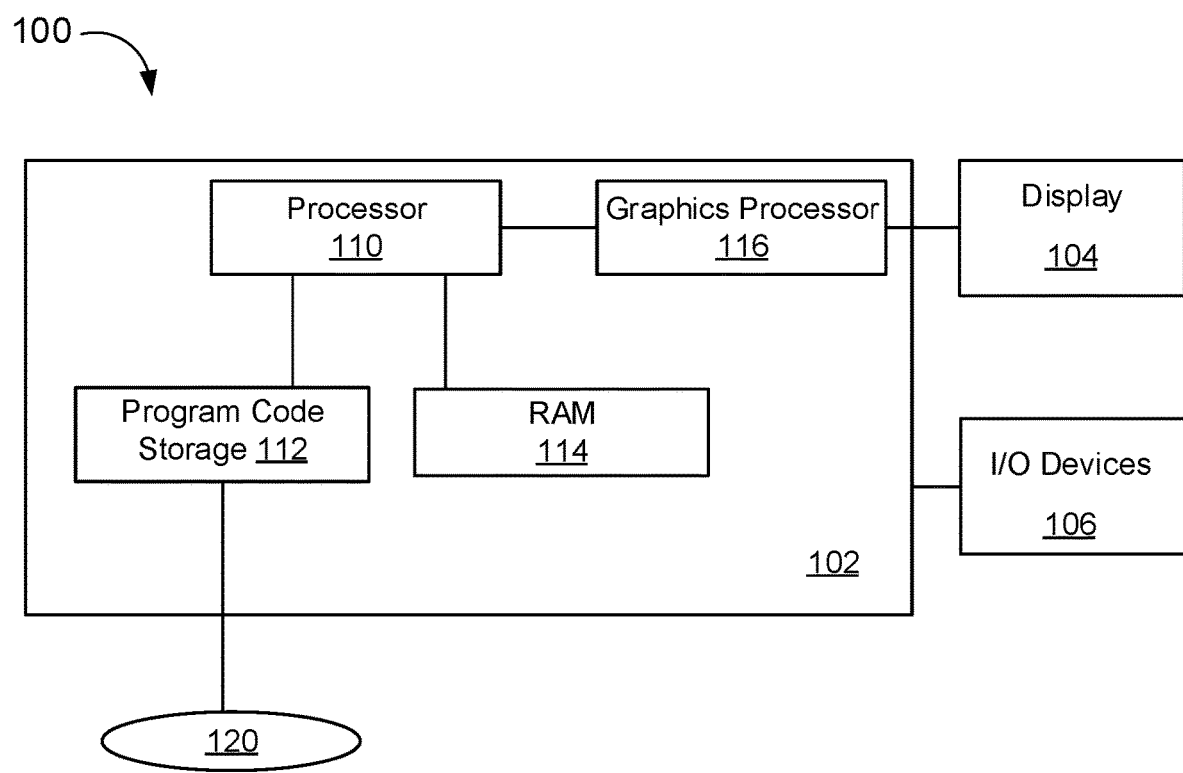
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described, shadow meshes are specialized meshes used for casting shadows in a rendered scene such as a game. Typically, a three-dimensional (3D) asset, such as a vehicle or building in a game, will have a main graphics mesh hand-authored by an artist, plus a number of secondary meshes that are used for a variety of other purposes. These secondary meshes are often specialized or simplified versions of the primary graphics mesh. A classic example of secondary meshes are level-of-detail (LOD) meshes, which are simplified versions of the primary graphics mesh, with successively fewer triangles, used as stand-ins for the primary mesh when the model is far away.

In one embodiment, shadow meshes are used only for rendering of shadows into a shadow buffer. The shadow buffer may be a separate, low resolution image buffer used for capturing shadows. The shadow mesh is rendered into the shadow buffer from the perspective of one (or each) of the lights in the scene. The shadow buffer is then used to render the shadows in the scene. As such, shadow meshes are never rendered directly into the main display buffer containing the final image, so are never seen directly, but only as rendered shadows.

Because shadow meshes are only seen as rendered shadows, shadow meshes can be significantly simpler than the graphics mesh. Shadows are rendered flat monochrome, essentially just black and white silhouettes. It may be also difficult to distinguish subtle or small details of the 3D model from the final shadows rendered in-game. Moreover, shadows are not closely studied, and may not even be consciously noticed at all unless they are wildly wrong. That allows the use of a shadow mesh, which can leave out small details or components of the graphics mesh. Also, since shadow meshes are only rendered in flat monochrome, shadow meshes do not need materials, and can omit any geometry that is present only to bound one material from another. Finally, since shadow meshes are only seen in silhouette, details that are not visible in silhouette can be omitted, to a degree.

In the disclosed embodiments, a shadow mesh should be cheaper to render than the primary graphics mesh, while still producing an acceptable shadow from any angle. This would suggest that we might be able to simply use a traditionally simplified version of the graphics mesh, for example one of the existing LODs. However, due to the risk of overshadowing, traditionally generated LODs are often not a great choice to be used as a shadow mesh.

Overshadowing occurs when a shadow mesh incorrectly casts a shadow on its own associated graphics mesh if the shadow mesh ever extends outside the graphics mesh. Shadow casting is a global operation, which is essential if a model is to be able to (legitimately) cast shadows on itself. Unfortunately, this invites the possibility that shadows may be cast incorrectly, where the shadow mesh extends outside the graphics mesh in use, so as to cast a shadow on the graphics mesh.

In order to prevent this, a shadow mesh must be painstakingly authored to ensure that the shadow mesh stays inside the corresponding graphics mesh, never extending outside the graphics mesh and causing overshadowing (i.e., casting a shadow where it should not).

What is more, the overshadowing concern is present not just for the primary graphics mesh, but also for all LOD meshes that might be used as stand-ins for the primary graphics mesh. As such, according to embodiments of the disclosure, the shadow mesh should be kept inside all graphics meshes of higher triangle count (both the primary graphics mesh or any LODs with higher triangle count). In some embodiments, when LODs of a lower triangle count than the shadow mesh are in use, it is cheaper to use such LODs directly to render the shadows.

In some embodiments, artist-authored meshes very often include many disconnected individual components (such as the handlebars, wheels, frame and saddle of a bicycle model). The disclosed embodiments provide a system and method to generate LODs for the artist-authored meshes, as well as a shadow mesh to be used for rendering shadows.

To generate the LODs and shadow mesh, embodiments of the disclosure generate a series of simplified versions of each component of an input graphics mesh. The simplified versions can be generated using a variety of mesh simplification techniques in which individual edges of the mesh for the component are collapsed iteratively to successively reduce the triangle count of the mesh for the component. When an edge is collapsed, the edge is replaced with a single vertex, and any incident faces are updated accordingly. The vertex is placed so as to optimally approximate the original geometry in the patch of surrounding faces.

In some embodiments, for each component, a range of possible versions is generated, from no triangles at all, through just a handful of triangles, up to the full-blown artist-authored original component, with each successive version only a few triangles more complex than the last. Note that the geometry of these multiple versions of a component typically are not cleanly nested inside one another, but instead overlap in complex ways.

Having generated a range of possible versions of each component, embodiments of the disclosure estimate a visual fidelity of each version, as a stand-in for its respective full resolution component. This can be done using a per-pixel error metric run on pairs of rendered images. Each pair of images compares a simplified version to the full resolution original, from a particular viewing angle. By comparing the images pixel-for-pixel, embodiments of the disclosure can estimate how much the approximation inherent in the simplified version might harm its visual fidelity. Embodiments of the disclosure then compute a score for each version of each component, so that each version has associated with it a triangle count and a fidelity score.

To generate the LODs, embodiments of the disclosure use a global optimization algorithm to select between the available versions of each component, optimizing the fidelity of the whole model while constraining the total triangle count to a user-specified budget for a given LOD and/or the shadow mesh. Some embodiments also take into account estimates of a relative importance of the components themselves, computing a final benefit estimate for each version of each component, which is then played off against its cost (e.g., triangle count). The algorithm essentially picks exactly one version for each component for a given LOD, maximizing the total benefit while limiting the total cost.

As described in greater detail herein, the shadow mesh can be generated in a similar, but slightly different way, than the LODs. A series of "shadow versions" of each component is first generated, similar to how LOD versions of components are generated. However, the shadow versions are constrained such that each lower triangle count shadow version is geometrically within the immediately preceding shadow version. An optimization algorithm then selects among the shadow versions of each component to generate the shadow mesh. In some embodiments, in an effort to avoid overshadowing, the maximum triangle count of each component selected for the shadow mesh is limited to ensure it is no more complex than the versions of that component selected for LODs of higher triangle count.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
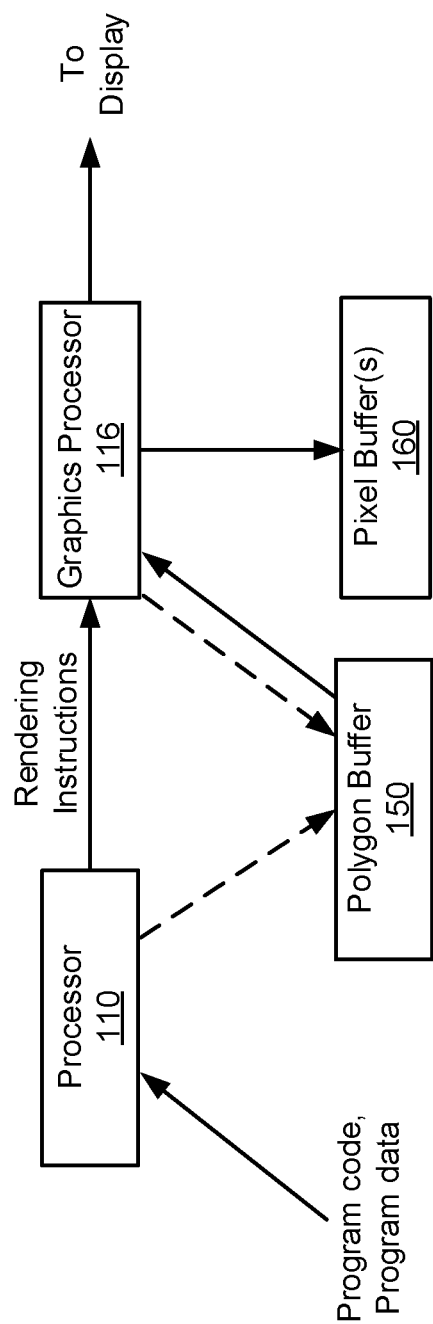
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
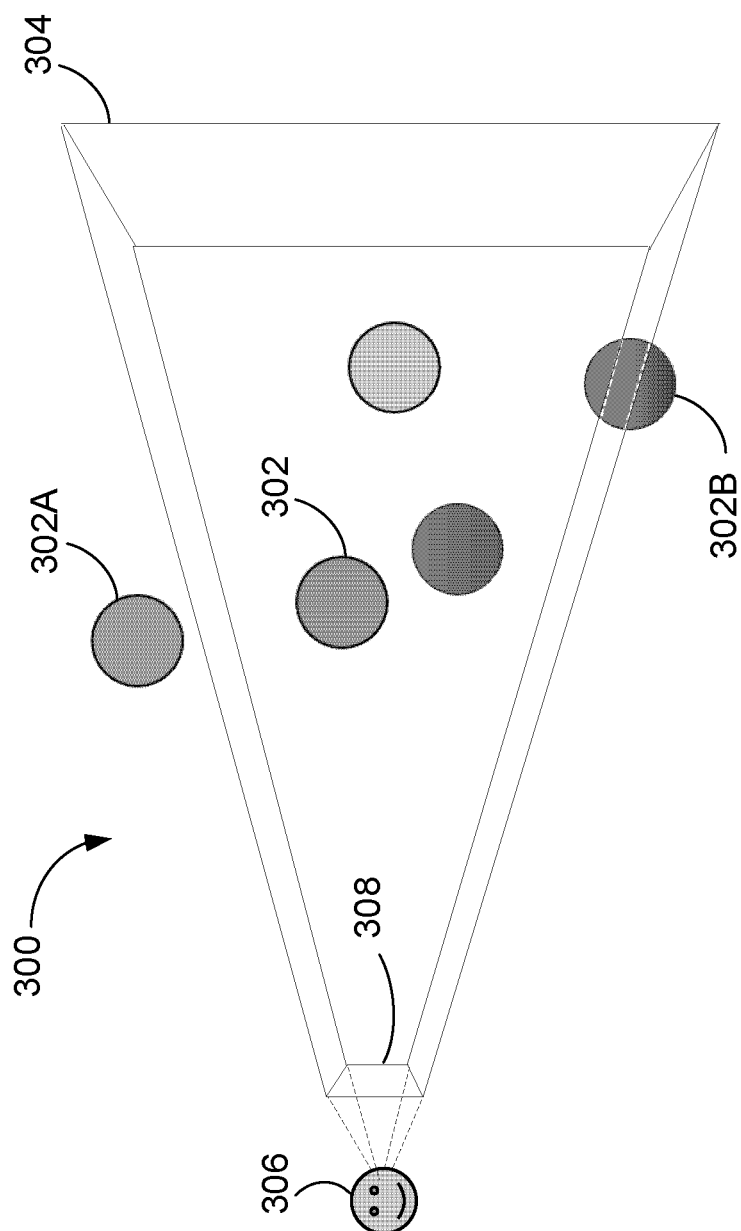
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
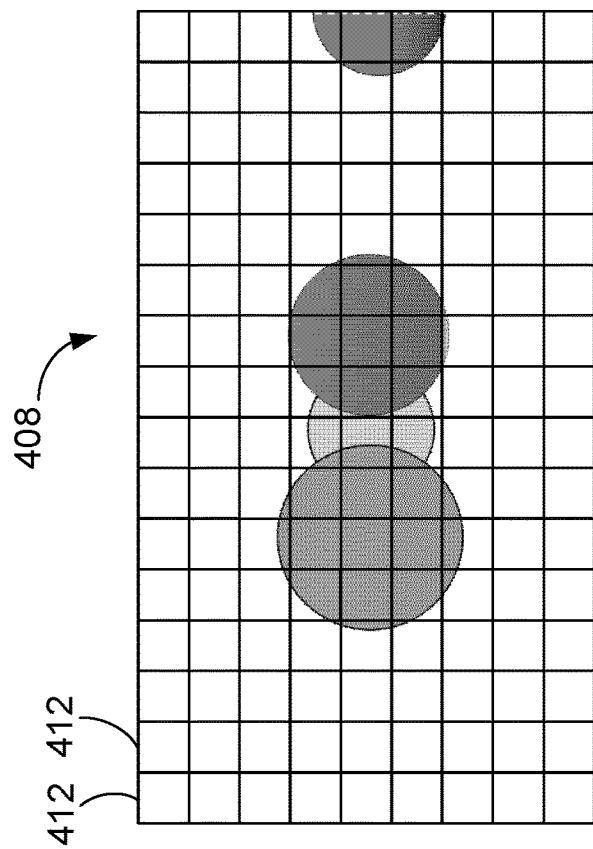
FIG. 4B is an example of an image of a scene, according to one embodiment.
Figure 4A:
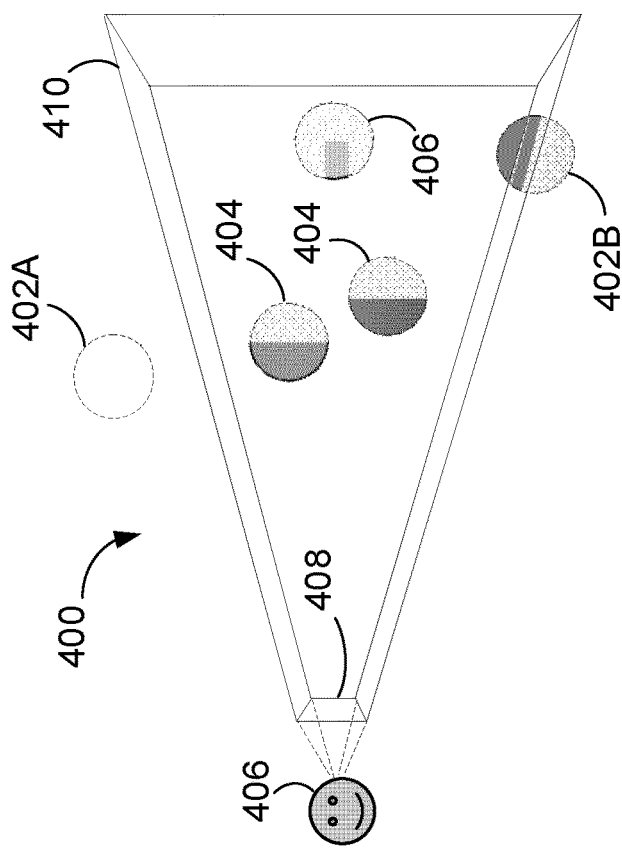
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
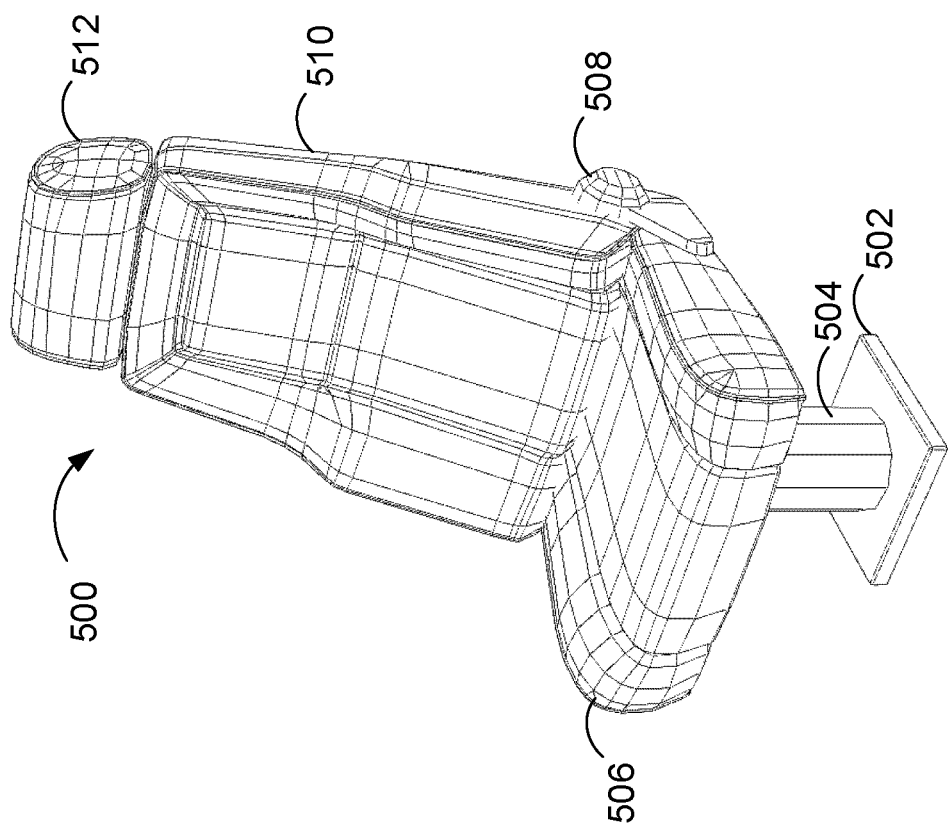
FIG. 5 is an example of a polygonal mesh, according to one embodiment.

FIG. 5 is an example of a polygonal mesh 500, according to one embodiment. As described, the polygonal mesh 500 is a graphics mesh may correspond to an artist-authored object. In the example shown, the object represents a chair. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In various embodiments, the polygonal mesh 500 may be comprised of one or more polygonal sub-meshes, also called "components." Each sub-mesh may include a series of polygons. In the example shown in FIG. 5, the polygonal mesh is comprised of multiple sub-meshes 502, 504, 506, 508, 510, 512, where sub-mesh 502 represents a chair base, sub-mesh 504 represents a chair post, sub-mesh 506 represents a chair seat, sub-mesh 508 represents a chair handle, sub-mesh 510 represents a chair back, and sub-mesh 512 represents a chair headrest.

Figure 6:
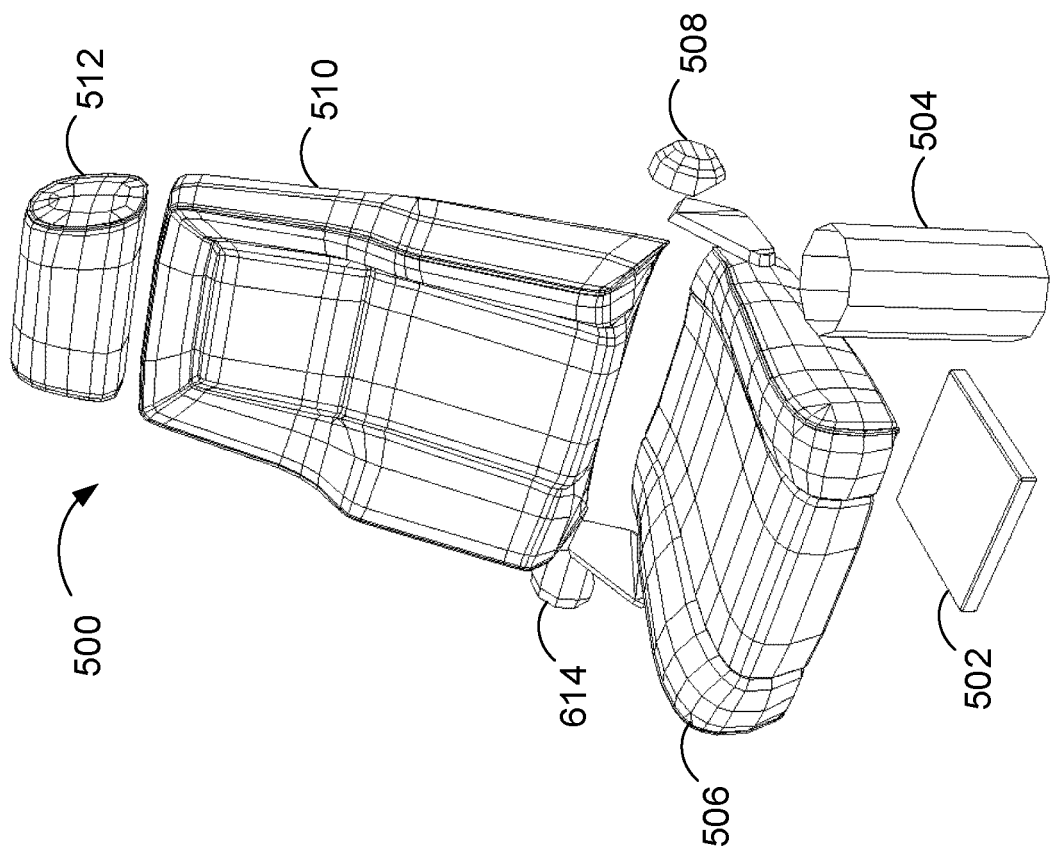
FIG. 6 is an exploded view of the object defined by the polygonal mesh shown in FIG. 5, according to one embodiment.

FIG. 6 is an exploded view of the object defined by the polygonal mesh 500 shown in FIG. 5, according to one embodiment. The multiple sub-meshes or components are shown in FIG. 6, including sub-mesh 502 that represents a chair base, sub-mesh 504 that represents a chair post, sub-mesh 506 that represents a chair seat, sub-mesh 508 that represents a chair handle, sub-mesh 510 that represents a chair back, and sub-mesh 512 that represents a chair headrest. Also shown in FIG. 6 is a sub-mesh 614 that represents a second chair handle that is not visible in the perspective view shown in FIG. 5, as the second chair handle is occluded by the chair seat and chair back in FIG. 5.

As described above, one or more simplified polygonal meshes, or LODs, can be generated that represent the polygonal mesh 500 to be used in operations to reduce the computational complexity of the operations.

Figure 7:
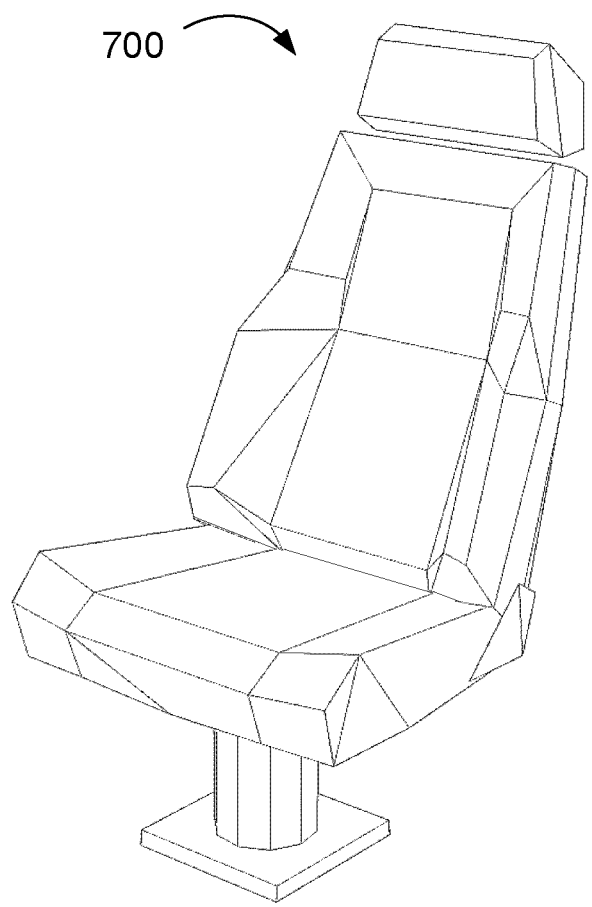
FIG. 7 is an example of a level-of-detail mesh corresponding to the polygonal mesh in FIG. 5, according to one embodiment.

FIG. 7 is an example of a level-of-detail mesh (or LOD) 700 corresponding to the polygonal mesh 500 in FIG. 5, according to one embodiment. As shown, the LOD 700 is a polygonal mesh that includes a smaller number of faces, edges, and vertices compared to the polygonal mesh 500 in FIG. 5. In some implementations, each sub-mesh of the polygonal mesh 500 is simplified individually to generate the LOD 700. The LOD 700 can be used for graphics operations, such as rendering operations, to reduce a resource cost, where, for the case of mesh simplification, a smaller number of polygons in the mesh corresponds to a smaller resource cost. Using LOD 700 for graphics operations allows the polygonal mesh corresponding to the LOD 700 to be stored using less space and may allow a computing device to render the polygonal mesh more easily and may allow a computing device to use fewer computing resources (e.g., using less processing power, less memory, etc.) when rendering the polygonal mesh or to perform shadowing. As a result, the LOD 700 is less expensive to store, process, render, etc. As used herein, the term "resource cost" is used to refer to the cost of computing resources in terms of storage, processing, rendering, etc.

Figure 8:
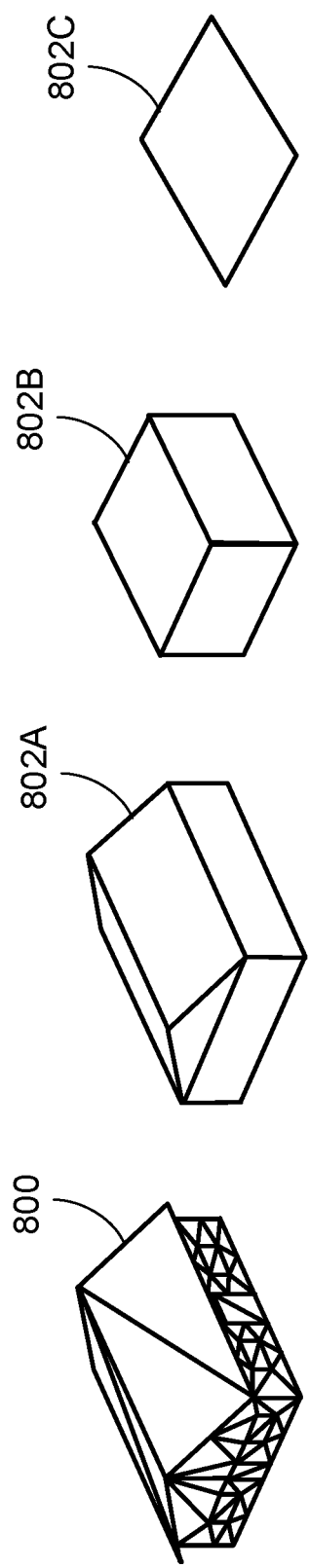
FIG. 8 is an example of a graphics mesh and multiple LODs for the graphics mesh, according to one embodiment.

FIG. 8 is an example of a graphics mesh 800 and multiple LODs 802A, 802B, 802C for the graphics mesh, according to one embodiment. As shown, the graphics mesh 800 is a polygonal mesh. LODs 802A, 802B, 802C are also polygonal meshes, but with successively less polygons, where LOD 802A includes less polygons than the graphics mesh 800, LOD 802B includes less polygons than LOD 802A, and LOD 802C includes less polygons than LOD 802B. The embodiments disclosed herein can be configured to generate N LODs for the graphics mesh 800, where N is greater than or equal to 1. Each LOD of the N LODs may be constrained to a polygon budget. As disclosed in greater detail herein, a mesh simplification technique can be used to generate the LODs by selecting, for each component or sub-mesh of the graphics mesh 800, a version of the component that maximizes fidelity, while still constrained by the triangle budget for the LOD.

Also as disclosed herein, a single shadow mesh can be generated for the graphics mesh. The graphics mesh has a configurable polygon (e.g., triangle) budget, much like a LOD. In some implementations, the triangle budget of the shadow mesh may be configured such that some of the LODs have a higher triangle budget than the shadow mesh, and some of the LODs have a lower triangle budget than the shadow mesh. For example, referring to FIG. 8, the shadow mesh may have a triangle budget than falls between the triangle budget of LOD 802A and the triangle budget of LOD 802B.

According to embodiments of the disclosure, multiple simplified "shadow" versions of each component are generated by a similar process that generates the traditional "LOD" versions. For each component of a graphics mesh, the disclosed embodiments start with the original (artist-authored) version of the component, and perform a series of simplifying operations in turn. After each simplification operation, embodiments of the disclosure take a snapshot, or copy, of the mesh as the next version.

Figure 9:
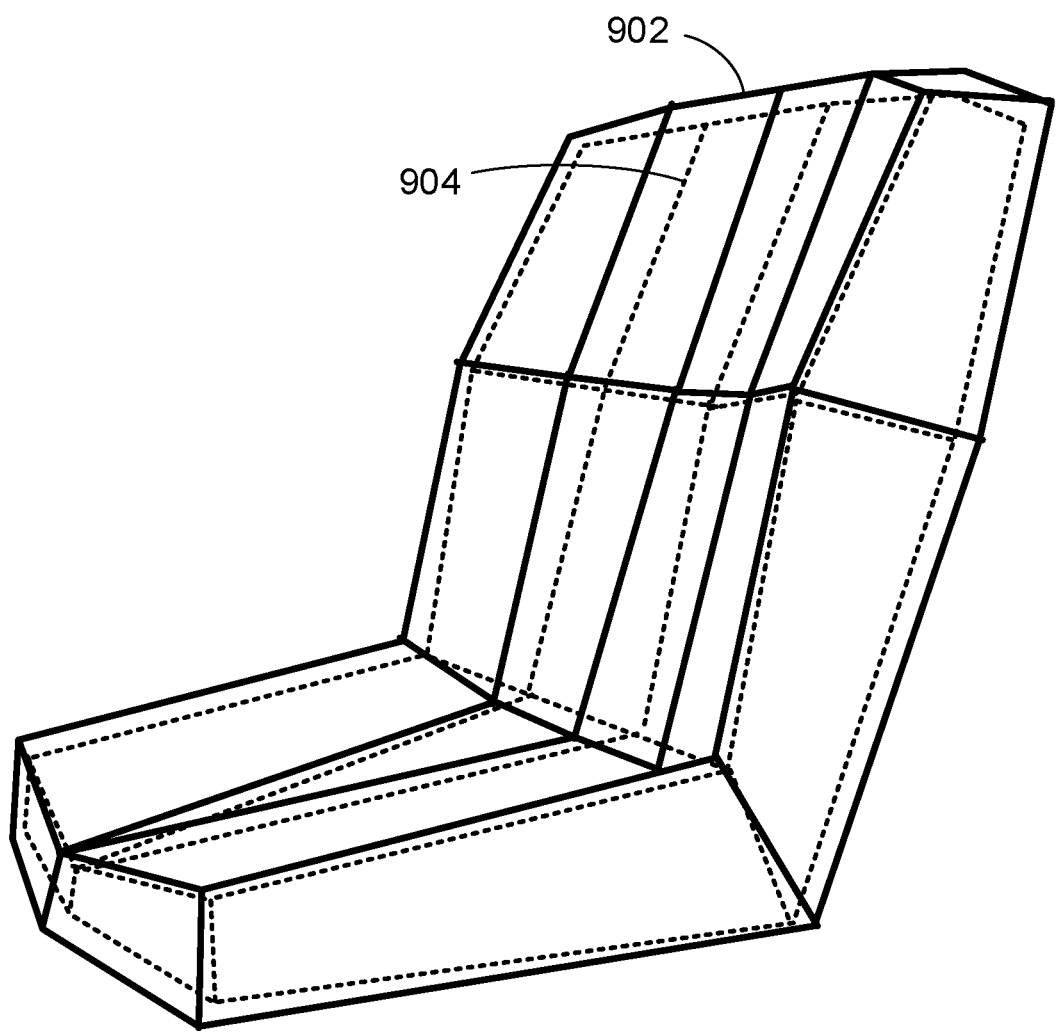
FIG. 9 is an example of a component of a LOD and a corresponding shadow mesh component, according to one embodiment.

FIG. 9 is an example of a component 902 of a LOD and a corresponding shadow mesh component 904, according to one embodiment. In one embodiment, the mesh topology of component 902 of the LOD is the same as the topology of shadow mesh component 904 (i.e., same number of vertices and faces), but the geometry of component 902 is different than the geometry of shadow mesh component 904. As shown in FIG. 9, the vertices of shadow mesh component 904 are located such that they are "inside" the mesh of component 902.

In some embodiments, mesh simplification operations are performed using edge collapses, which includes collapsing a single edge or multiple edges at once. Each edge collapse replaces an edge in the mesh with a single vertex, reducing the number of triangles in the mesh by two (in general, ignoring boundaries). In some implementations, the location for the new vertex can be computed using per-vertex quadrics, which is not described in detail herein for brevity. The computed location for the new vertex need not lie exactly on the existing polygonal surface, and in fact often lies some way above (or outside) it. Having the new vertex lie outside the mesh before edge collapse is often acceptable for generating LODs, where the computed collapse point best approximates the original geometry. However, for the shadow mesh, according to embodiments of the disclosure, the new vertex to which the edge is collapsed should lie below (or inside) the planes of all adjacent faces in the original surface prior to collapse, to ensure that the surface of each successive simplified shadow version of the component is entirely contained within the surface of the preceding version to avoid overshadowing.

In one embodiment, ensuring that the surface of each successive simplified shadow version is entirely contained within the surface of the preceding version can be achieved by moving the naively computed collapse point inside the planes of each of the faces incident to the edge prior to collapse. In one implementation, the collapse point is repeatedly moved inside the worst-offended plane, until it lies inside all planes.

Figure 10:
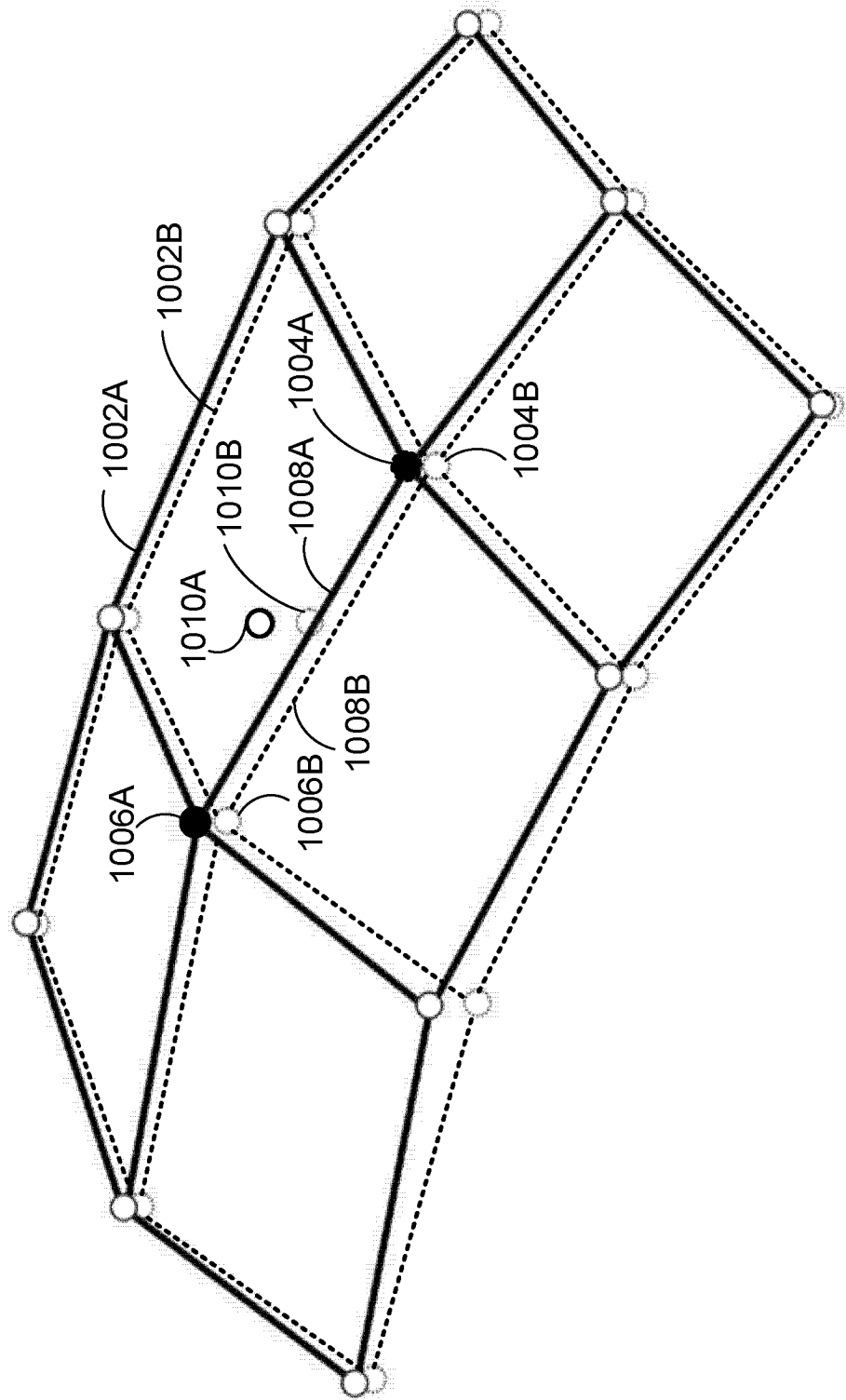
FIG. 10 is a conceptual diagram illustrating edge collapse for generating a LOD mesh and a corresponding shadow mesh, according to one embodiment.

FIG. 10 is a conceptual diagram illustrating edge collapse for generating a LOD mesh and a corresponding shadow mesh, according to one embodiment. In FIG. 10, mesh 1002A represents a portion of a polygonal mesh of a component to be used for generating a LOD. Mesh 1002B represents the corresponding shadow mesh version of the portion of the polygonal mesh of the component. It is noted that the topology of mesh 1002A is the same as the topology of mesh 1002B (i.e., same number of vertices and faces), but the geometry of mesh 1002A is different than the geometry of mesh 1002B (i.e., slightly different vertex locations). As shown in FIG. 10, the vertices of mesh 1002B are located such that they are "inside" mesh 1002A. In the example shown, this may be a result of prior edge collapses.

In FIG. 10, suppose that edge 1008A between vertices 1004A and 1006A of mesh 1002A is identified for edge collapse. The edge collapse operation results in a new vertex 1010A of the mesh 1002A. As shown, the location of vertex 1010A would fall outside the bounds of mesh 1002A (and also, therefore, outside the bounds of mesh 1002B representing the shadow mesh). Vertex 1010A is created for the mesh 1002A and the faces of mesh 1002A are updated to be incident on the vertex 1010A after edge 1008A is collapsed.

As noted, the edge 1008A to be collapsed has a corresponding edge 1008B between vertices 1004B and 1006B in the mesh 1002B representing the shadow mesh. The location of the new vertex 1010B to be created for the mesh 1002B, however, is not naively computed. Instead, after the initial location of vertex 1010B is computed (for example, based on quadrics associated with vertices 1004B and 1006B in the mesh 1002B), the location of vertex 1010B is moved such that it would lie within the immediately preceding version of mesh 1002B before edge collapse. As described, in one embodiment, ensuring that the surface of each successive simplified shadow version is entirely contained within the surface of the preceding version can be achieved by moving the naively computed collapse point inside the planes of each of the faces incident to the edge 1008B (in mesh 1002B) prior to collapse. In one implementation, the collapse point is repeatedly moved inside the worst-offended plane, until it lies inside all planes. The need to keep the collapse point within a plane can be phrased as a linear inequality constraining the dot product of the collapse point with the plane normal to be less than some constant. Some embodiments therefore rephrase the problem as a set of linear inequalities to be solved by conventional linear programming optimization, effectively finding an optimal point that is closest to the naively computed position, yet lies within all planes.

Note that in some pathological concave cases, such as where pairs of incident faces are parallel but opposite, it may not be possible to nudge the collapse point below all planes of the shadow mesh. Even in cases where the faces are nearly but not quite opposite, the point may be moved many times, a long way from its original location, to the distant vanishing point where the planes finally intersect. In such cases, it may be counter-productive to move the vertex that far. For that reason, some embodiments of the disclosure limit the total number of moves to some threshold limit, or the total distance that a vertex can be moved, accepting that in such cases the vertex may still lie outside some of the planes and possibly cause some overshadowing.

As described above and shown in FIG. 10, two separate positions for each vertex are stored during simplification. The first position stores the location of the vertex in the traditional "LOD" version of the component. The second stores the location of the vertex in the "shadow" versions of the component. In some embodiments, only the "shadow" vertex location is moved to be inside the shadow mesh, and the location of the vertex in the traditional LOD mesh remains at its computed collapse point.

However, ensuring that the shadow meshes of components are within the LOD meshes of corresponding components is not by itself enough to ensure that the generated shadow mesh never strays outside any of the generated LODs of higher budget. If each generated LOD is optimized independently by selecting among the available versions of components, then some selections may choose versions of components such that a LOD of higher overall triangle budget utilizes a less detailed "LOD" version of a specific component than the corresponding "shadow" version in the shadow mesh. Wherever that happens, the "shadow" version of the component may stray outside the "LOD" version, since the moving of vertex locations in the shadow mesh only aims to ensure that simpler versions stay inside more complex versions.

To prevent that scenario, embodiments of the disclosure impose an ordering on the versions of components selected in the different LOD meshes and the shadow mesh. Embodiments of the disclosure ensure that wherever a generated mesh A has higher overall budget than another mesh B, the version of each component selected in mesh A has at least as many triangles as the version of the same component selected in mesh B.

Some embodiments of the disclosure can therefore generate the LODs successively, from lowest budget to highest, adding more detail in each step. Instead of picking a solution for each LOD from scratch, the solution for each LOD begins with the solution picked for the preceding mesh, and then only adds detail by incrementally selecting component versions with more triangles.

As an example, suppose that the LOD meshes and the shadow mesh are constrained to the example triangle budgets in Table 1.

TABLE 1

| LOD/shadow mesh | Triangle budget |
| --- | --- |
| LOD1 | 550 |
| LOD2 | 480 |
| shadow mesh | 465 |
| LOD3 | 400 |
| LOD4 | 350 |

FIG. 11 is a conceptual diagram illustrating components of a graphics mesh and different versions of each component with different triangle counts, according to one embodiment. In the example shown in FIG. 11, supposed there are five components of the graphics mesh, numbered 1 to 5 in FIG. 11. For each component, multiple versions of the component are generated by edge collapse, each having a smaller number of triangles. In the example shown, the versions are labelled A to D. Additional versions may also be included (not shown), in some examples all the way down to a single triangle or no triangles for the component.

In one implementation, each version of a component may be associated with two separate meshes: (1) a LOD mesh version to be used for LOD generation, and (2) a shadow mesh version to be used for generating a shadow mesh, as described above. Both the LOD mesh version and the shadow mesh version of a given component would include the same number of triangles, but the geometry of the LOD mesh version and the shadow mesh version may be different to account for movement of vertices in the shadow mesh version to be within the bounds of the preceding shadow mesh version at each edge collapse operation.

Figure 12:
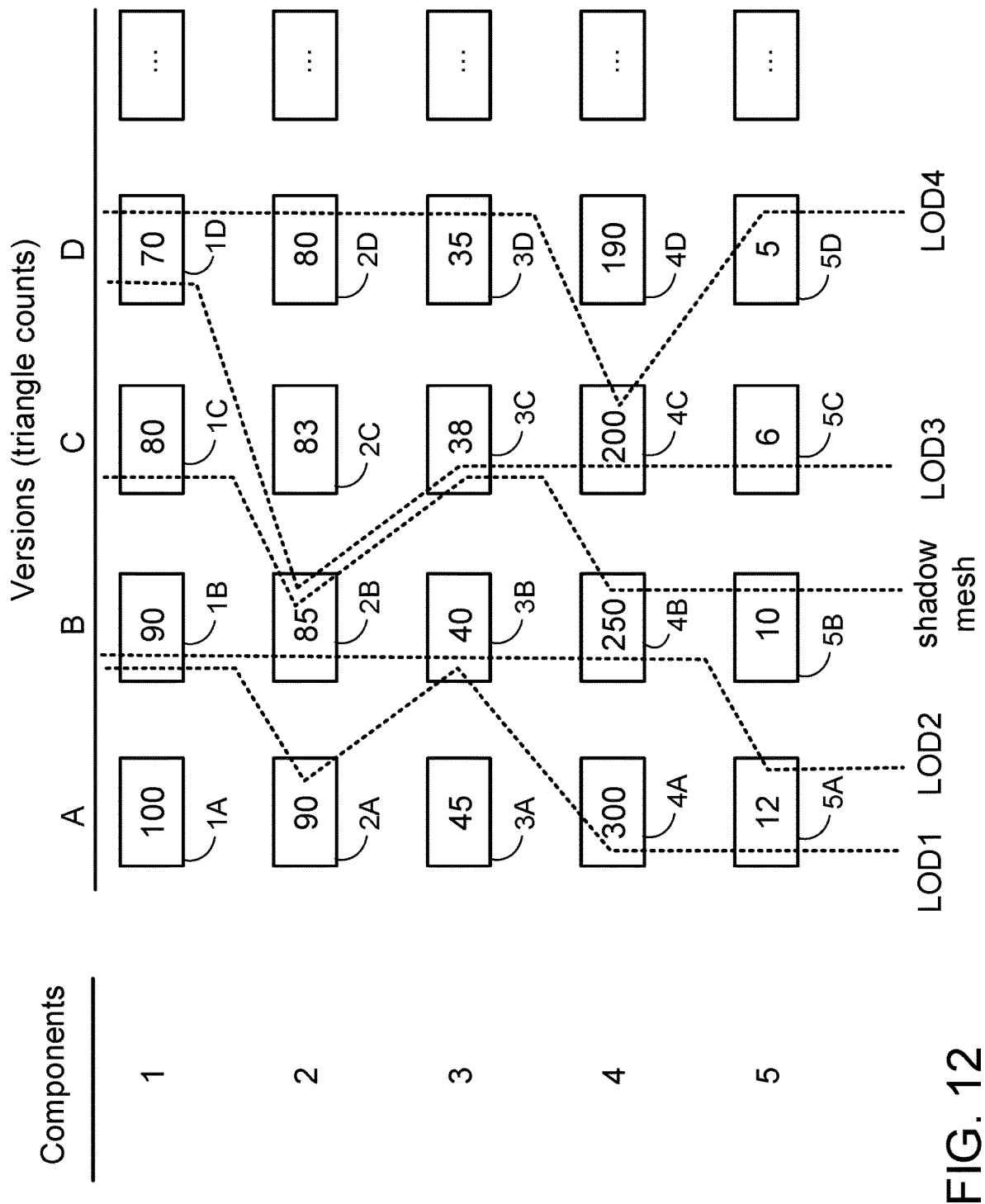
FIG. 12 is a conceptual diagram illustrating selection of different versions of components to generate LOD meshes and a shadow mesh, according to one embodiment.

FIG. 12 is a conceptual diagram illustrating selection of different versions of components to generate LOD meshes and a shadow mesh, according to one embodiment. Referring to the example in Table 1, the smallest triangle budget LOD to be generated is LOD4 with a triangle budget of 350. An optimization algorithm selects versions of LOD components to satisfy the triangle budget. In the example shown, when selecting LOD components for LOD4, the optimization algorithm selects version 1D for component 1, version 2D for component 2, version 3D for component 3, version 4C for component 4, and version 5D for component 5.

Then, when selecting LOD components for the next highest budget LOD (e.g., LOD3 with a triangle budget of 400), embodiments of the disclosure limit the minimum triangle count of the versions picked for each component to the triangle count of the version of the same component picked in the immediately lower triangle budget LOD. In the example shown, when selecting LOD components for LOD3, the optimization algorithm selects version 1D for component 1, version 2B for component 2, version 3C for component 3, version 4C for component 4, and version 5C for component 5.

Selecting components for the shadow mesh is done similarly to selecting components for LOD meshes, where the optimization algorithm is limited to selecting components such that the minimum triangle count of the versions picked for each component of the shadow mesh are at least as large as the same component picked in the immediately lower triangle budget LOD. One difference is that when selecting components for the shadow mesh, the optimization algorithm selects among the "shadow mesh versions" of the components, and not the LOD versions (although both have the same number of triangles). In the example shown, when selecting shadow mesh components for the shadow mesh, the optimization algorithm selects version 1C for component 1, version 2B for component 2, version 3C for component 3, version 4B for component 4, and version 5B for component 5.

Then the remaining LOD meshes with higher triangle budget than the shadow mesh are generated. In the example shown, when selecting LOD components for LOD2, the optimization algorithm selects version 1B for component 1, version 2B for component 2, version 3B for component 3, version 4B for component 4, and version 5A for component 5. As also shown, when selecting LOD components for LOD1, the optimization algorithm selects version 1B for component 1, version 2A for component 2, version 3B for component 3, version 4A for component 4, and version 5A for component 5.

In another embodiment, the highest triangle budget LOD is generated first by selecting among LOD components (e.g., LOD1 in FIG. 12). Then, the next highest triangle budget LOD is generated, where the optimization algorithm that selects among LOD components is constrained on the upper limit, such that no LOD component is selected for the LOD with a higher triangle count than the next highest triangle budget LOD. Similarly, when the shadow mesh is generated, the optimization algorithm selects among shadow versions of components and is constrained on the upper limit, such that no shadow version of a component is selected for the shadow mesh with a higher triangle count than the corresponding LOD component selected for the LOD with closest triangle budget that is greater than the triangle budget of the shadow mesh.

In some embodiments, a custom fidelity metric can be used by the optimization algorithm when selecting among versions of components for the shadow mesh (or one or more of the LOD meshes). While, in some embodiments, the disclosed ordering of component versions prevents the selection of an awkwardly high resolution shadow mesh component for the shadow mesh, the ordering alone does not prevent the optimization algorithm from selecting of an awkwardly low resolution version of a component. For example, the optimization algorithm might choose to represent a relatively unimportant component with a very low-detail version of that component that poorly approximates its original shape. Being only a few triangles, the low-detail version of the component might well stray outside the corresponding LOD component in places where the component is concave, such that the heavily simplified version "cuts across" the concavity.

In order to discourage this, some embodiments use a custom fidelity metric to estimate the fidelity of the shadow mesh versions of each component. In one embodiment, the fidelity estimation of the shadow mesh versions uses an image-based metric that compares pairs of images of the full resolution component from the graphics mesh and the simplified shadow mesh versions to count pixels where they differ. The custom metric specializes this comparison to only consider black-and-white visibility (e.g., ignoring shading and material accuracy, since shadow meshes are only seen in silhouette) and to penalize overshadowing more than undershadowing. That is, embodiments of the disclosure impose a much heavier penalty at pixels where the simplified version is shown but the original is not, suggesting that the simplified version would incorrectly cast a shadow at those points.

Also, in some embodiments, the generated shadow mesh may be slightly "shrunken" further by moving each of its vertices backward slightly (in the direction opposite to its average face normal). This has the effect of shrinking the entire shadow mesh marginally, helping to keep the shadow mesh inside the LOD meshes. Note the shrinking is different from applying a uniform scale everywhere, which in general would tend to move some faces forward rather than backward (and specifically, where the mesh is concave). Although some embodiments apply this shrinking to the whole shadow mesh after the shadow mesh has been generated, other embodiments could optionally apply the shrinking to the generation shadow mesh versions of components instead.

According to embodiments of the disclosure, once the various LOD meshes and the shadow mesh are generated, the shadow mesh can be used to cast shadows whenever a LOD of higher triangle budget (or the full, original graphics mesh) is being used in rendering the scene. In cases where a LOD with a lower triangle budget than the shadow mesh is being used, the lower triangle budget LOD itself can be used for casting shadows and the shadow mesh is not used.

Figure 13:
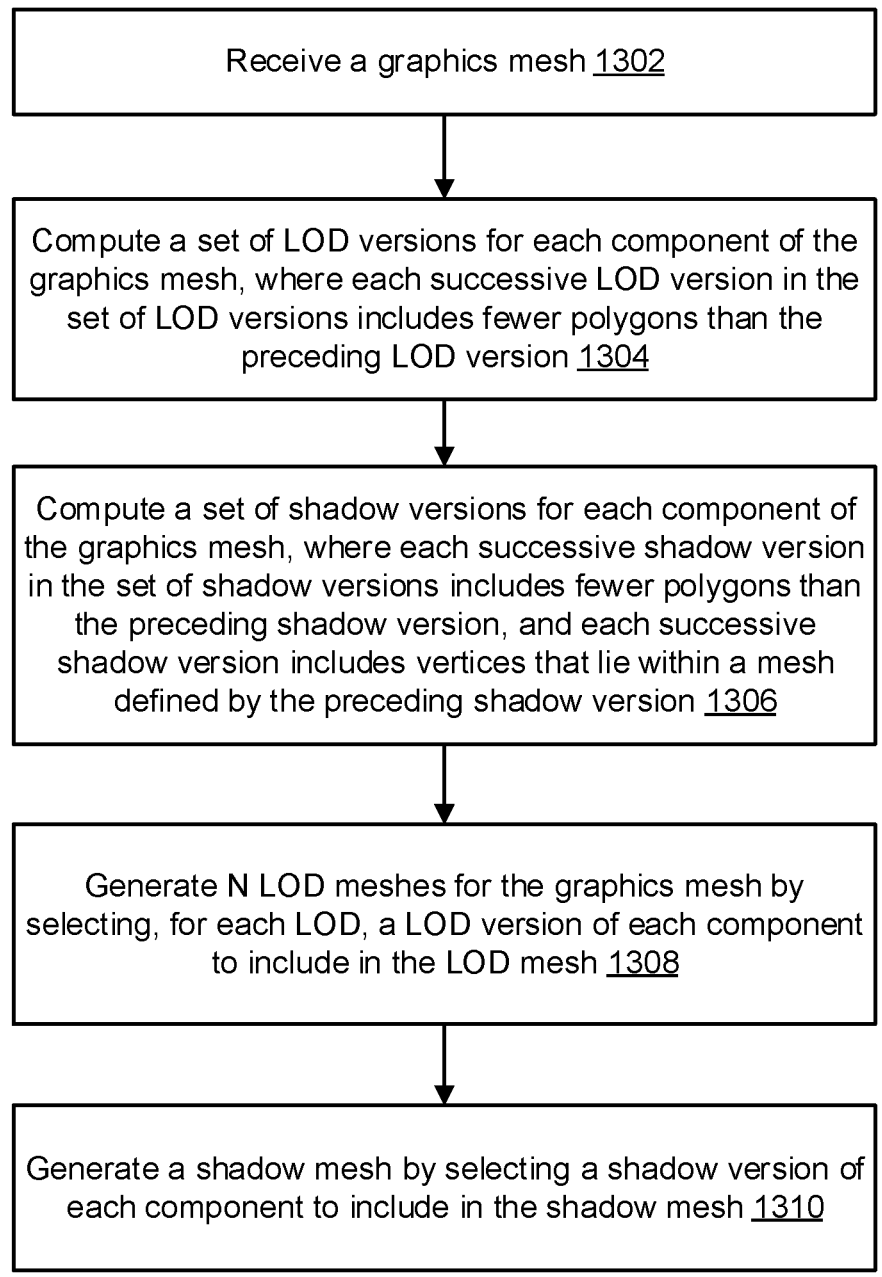
FIG. 13 is a flow diagram of method steps of generating one or more LOD meshes and a shadow mesh, according to one embodiment.

FIG. 13 is a flow diagram of method steps of generating one or more LOD meshes and a shadow mesh, according to one embodiment. In various implementations, the method can be performed by the processor 110, the graphics processor 116, or a combination of the processor 110 and the graphics processor 116. In some embodiments, two or more steps shown in FIG. 13 may be performed by the same process or at the same time or in a different order.

As shown, the method begins at step 1302, where the processor receives a graphics mesh. The graphics mesh may be an artist-authored mesh that include one or more components. In one implementation, the components are disconnected from one another such that no vertex of the graphics mesh is shared by two components.

At step 1304, the processor computes a set of LOD versions for each component of the graphics mesh, where each successive LOD version in the set of LOD versions includes fewer polygons than the preceding LOD version. In one implementation, LOD versions of a component are generating by successively performing edge collapse operations on the component, starting with the full resolution version of the component in the graphics mesh.

At step 1306, the processor computes a set of shadow versions for each component of the graphics mesh, where each successive shadow version in the set of shadow versions includes fewer polygons than the preceding shadow version, and each successive shadow version includes vertices that lie within a mesh defined by the preceding shadow version. In one implementation, the set of LOD versions and the set of shadow versions are generated using the same choices for edge collapse. However, as described above, collapse points for the shadow versions are constrained to lie with a mesh defined by the preceding shadow version. As such, each shadow version of a component has a corresponding LOD version with the same topology, but possibly different geometry. In some embodiments, the LOD versions and shadow versions of each component may be generated at the same time, by a process that generates successive new versions of type, with the same topology, triangle counts or polygon counts, in lock-step.

At step 1308, the processor generates N LOD meshes for the graphics mesh by selecting, for each LOD mesh, a LOD version of each component to include in the LOD mesh. In some embodiments, N is an integer greater than or equal to 1. Each LOD mesh of the N LOD meshes may be associated with a different triangle (or polygon) budget. As described in reference to FIG. 11 and FIG. 12, in one implementation, a lowest triangle budget LOD may be generated first by executing an optimization algorithm that selects a LOD version of each component to include in the LOD mesh. For subsequent higher triangle budget LOD meshes, the optimization algorithm that selects a LOD version from the set of LOD versions for each component is constrained such that, for the subsequent LOD mesh, no LOD version of a component is selected that includes fewer polygons than a number of polygons of the LOD version for that component selected for preceding (lower triangle budget) LOD mesh of the N LOD meshes.

At step 1310, the processor generates a shadow mesh by selecting a shadow version of each component to include in the shadow mesh. As described, the process for selecting shadow versions of components is similar to that of selecting LOD versions of components for a LOD mesh. In one implementation, the optimization algorithm that selects among the shadow versions of components is constrained such that no shadow version of a component is selected for the shadow mesh that includes fewer polygons than a number of polygons of the LOD version for that component selected for a LOD mesh of the N LOD meshes that includes a largest polygon budget that is lower than a polygon budget of the shadow mesh. In another implementation, the optimization algorithm that selects among the shadow versions of components is constrained such that no shadow version of a component is selected for the shadow mesh that includes more polygons than a number of polygons of the LOD version for that component selected for a LOD mesh of the N LOD meshes that includes a polygon budget that is larger than a polygon budget of the shadow mesh. Also, in some embodiments, the fidelity metric used by the optimization algorithm to select among the shadow versions of components may heavily penalize shadow versions that cause overshadowing relative to the full resolution version of the component in the original graphics mesh.

In sum, embodiments of the disclosure provide systems and methods for generating LOD meshes and a shadow mesh by selecting between multiple possible versions of each component, maximizing total benefit while limiting total cost. In one embodiment, in an effort to avoid overshadowing, the maximum triangle count of each component selected for the shadow mesh is limited to ensure it is no more complex than the versions of that component selected for LODs of higher triangle count.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating a shadow mesh, the method comprising:
    receiving, by one or more processors, a graphics mesh that is a computer representation of a three-dimensional (3D) object, wherein the graphics mesh comprises a set of components, and wherein each component in the set of components is a polygonal mesh;
    for each component in the set of components, generating, by the one or more processors, a set of shadow versions of the component, wherein different shadow versions of the component include different polygon counts, wherein the different shadow versions of the component are ordered into levels by decreasing polygon count, wherein successive shadow versions of the component are generated by performing edge collapse operations to reduce a number of polygons in a successive shadow version relative to a preceding shadow version of the component, and wherein, for each shadow version of the component, a computed location of a new vertex created by the edge collapse operations is constrained to be located inside a set of planes of adjacent faces of an edge, from a preceding shadow version of the component, that is collapsed during the edge collapse operations;
    generating, by the one or more processors, a shadow mesh corresponding to the graphics mesh, wherein the shadow mesh is associated with a polygon budget, wherein generating the shadow mesh is based on performing an optimization algorithm that selects, for each component in the set of components, a shadow version of the component from the set of shadow versions of the component to include in the shadow mesh, wherein a first component in the shadow mesh corresponds to a first level shadow version of the first component and a second component in the shadow mesh corresponds to a second level shadow version of the second component, wherein the first level is different than the second level, and wherein the optimization algorithm optimizes visual fidelity of the shadow mesh while constrained to the polygon budget of the shadow mesh; and
    outputting, by the one or more processors, the shadow mesh, wherein the shadow mesh is configured to be used to cast shadows from one or more light sources when rendering a scene including the 3D object.

2. The method according to claim 1, further comprising:
for each component in the set of components, generating, by the one or more processors, a set of level-of-detail (LOD) versions of the component, wherein different LOD versions of the component include different polygon counts, and wherein successive LOD versions of the component are generated by performing edge collapse operations to reduce a number of polygons in a successive LOD version relative to a preceding LOD version of the component;
generating, by the one or more processors, a LOD mesh corresponding to the graphics mesh, wherein a polygon budget of the LOD mesh is different from the polygon budget of the shadow mesh, and wherein generating the LOD mesh is based on performing an optimization algorithm that selects, for each component in the set of components, a LOD version of the component from the set of LOD versions of the component to include in the LOD mesh; and
outputting, by the one or more processors, the LOD mesh, wherein the LOD mesh is configured to replace the graphics mesh when rendering the scene including the 3D object.

3. The method according to claim 1, wherein generating a set of LOD versions of the first component comprises:
receiving a full resolution version of the first component included in the graphics mesh;
performing edge collapse operations on the full resolution version of the first component to generate a first LOD version of the first component; and
performing edge collapse operations on the first LOD version to reduce a number of polygons in successive LOD versions relative to a preceding LOD version of the first component.

4. The method according to claim 3, wherein generating a set of shadow versions of the first component comprises:
receiving the full resolution version of the first component included in the graphics mesh;
performing edge collapse operations on the full resolution version of the first component to generate a first shadow version of the first component; and
performing edge collapse operations on the first shadow version to reduce a number of polygons in successive shadow versions relative to a preceding shadow version of the first component.

5. The method according to claim 4,
wherein each LOD version in the set of LOD versions of the first component has a corresponding shadow version in the set of shadow versions of the first component; and
wherein the LOD version and a corresponding first shadow version of the first component have a same number of vertices and faces, and wherein locations of at least some of the vertices in the first shadow version of the first component are different than locations of corresponding vertices in the first LOD version of the first component.

6. The method according to claim 1, further comprising:
generating, by the one or more processors, N LOD meshes, wherein N is an integer greater than or equal to 1;
wherein each LOD mesh of the N LOD meshes is associated with a different polygon budget.

7. The method according to claim 6, wherein, for a given LOD mesh of the N LOD meshes, the optimization algorithm that selects a LOD version from the set of LOD versions for each component is constrained such that, for the given LOD mesh, no LOD version of a component is selected that includes fewer polygons than a number of polygons of the LOD version for that component selected for another LOD mesh of the N LOD meshes having a lower polygon budget than a polygon budget of the given LOD mesh.

8. The method according to claim 6, wherein performing the optimization algorithm that selects, for each component in the set of components, a shadow version of the component from the set of shadow versions of the component to include in the shadow mesh comprises:
constraining the optimization algorithm such that no shadow version of a component is selected for the shadow mesh that includes more polygons than a number of polygons of the LOD version for that component selected for a LOD mesh of the N LOD meshes that includes a polygon budget that is greater than a polygon budget of the shadow mesh.

9. The method according to claim 1, wherein the graphics mesh is an artist-authored mesh, and the components in the set of components are disconnected from one another such that no vertex of the graphics mesh is shared by two components in the set of components.

10. A non-transitory computer-readable storage medium storing instructions that, when executed by one or more processors, causes a computing device to generate a shadow mesh, by performing the steps of:
receiving a graphics mesh that is a computer representation of a three-dimensional (3D) object, wherein the graphics mesh comprises a set of components, and wherein each component in the set of components is a polygonal mesh;
for each component in the set of components, generating a set of shadow versions of the component, wherein different shadow versions of the component include different polygon counts, wherein the different shadow versions of the component are ordered into levels by decreasing polygon count, wherein successive shadow versions of the component are generated by performing edge collapse operations to reduce a number of polygons in a successive shadow version relative to a preceding shadow version of the component, and wherein, for each shadow version of the component, a computed location of a new vertex created by the edge collapse operations is constrained to be located inside a set of planes of adjacent faces of an edge, from a preceding shadow version of the component, that is collapsed during the edge collapse operations;
generating a shadow mesh corresponding to the graphics mesh, wherein the shadow mesh is associated with a polygon budget, wherein generating the shadow mesh is based on performing an optimization algorithm that selects, for each component in the set of components, a shadow version of the component from the set of shadow versions of the component to include in the shadow mesh, wherein a first component in the shadow mesh corresponds to a first level shadow version of the first component and a second component in the shadow mesh corresponds to a second level shadow version of the second component, wherein the first level is different than the second level, and wherein the optimization algorithm optimizes visual fidelity of the shadow mesh while constrained to the polygon budget of the shadow mesh; and outputting the shadow mesh, wherein the shadow mesh is configured to be used to cast shadows from one or more light sources when rendering a scene including the 3D object.

11. The computer-readable storage medium according to claim 10, the steps further comprising:
for each component in the set of components, generating a set of level-of-detail (LOD) versions of the component, wherein different LOD versions of the component include different polygon counts, and wherein successive LOD versions of the component are generated by performing edge collapse operations to reduce a number of polygons in a successive LOD version relative to a preceding LOD version of the component;
generating a LOD mesh corresponding to the graphics mesh, wherein a polygon budget of the LOD mesh is different from the polygon budget of the shadow mesh, and wherein generating the LOD mesh is based on performing an optimization algorithm that selects, for each component in the set of components, a LOD version of the component from the set of LOD versions of the component to include in the LOD mesh; and
outputting the LOD mesh, wherein the LOD mesh is configured to replace the graphics mesh when rendering the scene including the 3D object.

12. The computer-readable storage medium according to claim 10, wherein generating a set of LOD versions of the first component comprises:
receiving a full resolution version of the first component included in the graphics mesh;
performing edge collapse operations on the full resolution version of the first component to generate a first LOD version of the first component; and
performing edge collapse operations on the first LOD version to reduce a number of polygons in successive LOD versions relative to a preceding LOD version of the first component.

13. The computer-readable storage medium according to claim 12, wherein generating a set of shadow versions of the first component comprises:
receiving the full resolution version of the first component included in the graphics mesh;
performing edge collapse operations on the full resolution version of the first component to generate a first shadow version of the first component; and
performing edge collapse operations on the first shadow version to reduce a number of polygons in successive shadow versions relative to a preceding shadow version of the first component.

14. The computer-readable storage medium according to claim 13,
wherein each LOD version in the set of LOD versions of the first component has a corresponding shadow version in the set of shadow versions of the first component; and
wherein the LOD version and a corresponding first shadow version of the first component have a same number of vertices and faces, and wherein locations of at least some of the vertices in the first shadow version of the first component are different than locations of corresponding vertices in the first LOD version of the first component.

15. The computer-readable storage medium according to claim 10, the steps further comprising:
generating N LOD meshes, wherein N is an integer greater than or equal to 1;
wherein each LOD mesh of the N LOD meshes is associated with a different polygon budget.

16. The computer-readable storage medium according to claim 15, wherein, for a given LOD mesh of the N LOD meshes, the optimization algorithm that selects a LOD version from the set of LOD versions for each component is constrained such that, for the given LOD mesh, no LOD version of a component is selected that includes fewer polygons than a number of polygons of the LOD version for that component selected for another LOD mesh of the N LOD meshes having a lower polygon budget than a polygon budget of the given LOD mesh.

17. The computer-readable storage medium according to claim 15, wherein performing the optimization algorithm that selects, for each component in the set of components, a shadow version of the component from the set of shadow versions of the component to include in the shadow mesh comprises:
constraining the optimization algorithm such that no shadow version of a component is selected for the shadow mesh that includes more polygons than a number of polygons of the LOD version for that component selected for a LOD mesh of the N LOD meshes that includes a polygon budget that is greater than a polygon budget of the shadow mesh.

18. A device for generating a shadow mesh, the device comprising:
a memory storing instructions; and
one or more processors configured to the execute the instructions to cause the device to:
receive a graphics mesh that is a computer representation of a three-dimensional (3D) object, wherein the graphics mesh comprises a set of components, and wherein each component in the set of components is a polygonal mesh;
for each component in the set of components, generate a set of shadow versions of the component, wherein different shadow versions of the component include different polygon counts, wherein the different shadow versions of the component are ordered into levels by decreasing polygon count, wherein successive shadow versions of the component are generated by performing edge collapse operations to reduce a number of polygons in a successive shadow version relative to a preceding shadow version of the component, and wherein, for each shadow version of the component, a computed location of a new vertex created by the edge collapse operations is constrained to be located inside a set of planes of adjacent faces of an edge, from a preceding shadow version of the component, that is collapsed during the edge collapse operations;
generate a shadow mesh corresponding to the graphics mesh, wherein the shadow mesh is associated with a polygon budget, wherein generating the shadow mesh is based on performing an optimization algorithm that selects, for each component in the set of components, a shadow version of the component from the set of shadow versions of the component to include in the shadow mesh, wherein a first component in the shadow mesh corresponds to a first level shadow version of the first component and a second component in the shadow mesh corresponds to a second level shadow version of the second component, wherein the first level is different than the second level, and wherein the optimization algorithm optimizes visual fidelity of the shadow mesh while constrained to the polygon budget of the shadow mesh; and output the shadow mesh, wherein the shadow mesh is configured to be used to cast shadows from one or more light sources when rendering a scene including the 3D object.

19. The device according to claim 18, wherein the one or more processors executing the instructions further causes the device to:

generate N LOD meshes, wherein N is an integer greater than or equal to 1;

wherein each LOD mesh of the N LOD meshes is associated with a different polygon budget;

wherein, for a given LOD mesh of the N LOD meshes, the optimization algorithm that selects a LOD version from the set of LOD versions for each component is constrained such that, for the given LOD mesh, no LOD version of a component is selected that includes fewer polygons than a number of polygons of the LOD version for that component selected for another LOD mesh of the N LOD meshes having a lower polygon budget than a polygon budget of the given LOD mesh.

20. The device according to claim 19, wherein performing the optimization algorithm that selects, for each component in the set of components, a shadow version of the component from the set of shadow versions of the component to include in the shadow mesh comprises:

constraining the optimization algorithm such that no shadow version of a component is selected for the shadow mesh that includes more polygons than a number of polygons of the LOD version for that component selected for a LOD mesh of the N LOD meshes that includes a polygon budget that is greater than a polygon budget of the shadow mesh.

* * * * *